July 3, 1951  W. GRUPP  2,559,355
SAW
Filed Sept 13, 1949

INVENTOR
Wilhelm Grupp
BY Richards Geier
ATTORNEYS

Patented July 3, 1951

2,559,355

UNITED STATES PATENT OFFICE 2,559,355

SAW

Wilhelm Grupp, Oberkochen, Germany, assignor to Conrad Wolfgang Schnyder, New York, N. Y.

Application September 13, 1949, Serial No. 115,365
In Switzerland September 15, 1948

6 Claims. (Cl. 143—133)

This invention relates to saws, and refers more particularly to circular and band saws for cutting timber and the like.

An object of the present invention is the provision of a saw which is so constructed that the kick-back prevailing in prior art devices is entirely eliminated, and the danger of injury to user is substantially reduced.

A further object of the present invention is the provision of saws which can be operated without any substantial noise.

Yet another object is the provision of saws which cut better than existing ones, and the teeth of which are less subject to vibrations.

A still further object is the provision of a saw, which can be inexpensively manufactured, the teeth of which all cut evenly and uniformly, and which can be easily and adequately sharpened.

Other objects of the present invention will become apparent in the course of the following specification.

The objects of the present invention may be realized through the provision of a saw, the teeth of which do not follow each other uninterruptedly, as in prior art constructions, but are located at a substantial distance, one from the other, with the spacing being equal to at least three, or sometimes four, times the opening of the gullet of each tooth. The space between the teeth is constituted by a uniform, non-cutting edge which is straight in band saws and which is of circular configuration in the case of a circular saw.

Another important characteristic feature of the present invention is the specific form of saw teeth which is illustrated in the accompanying drawings and described in the following detailed description.

Figure 1:
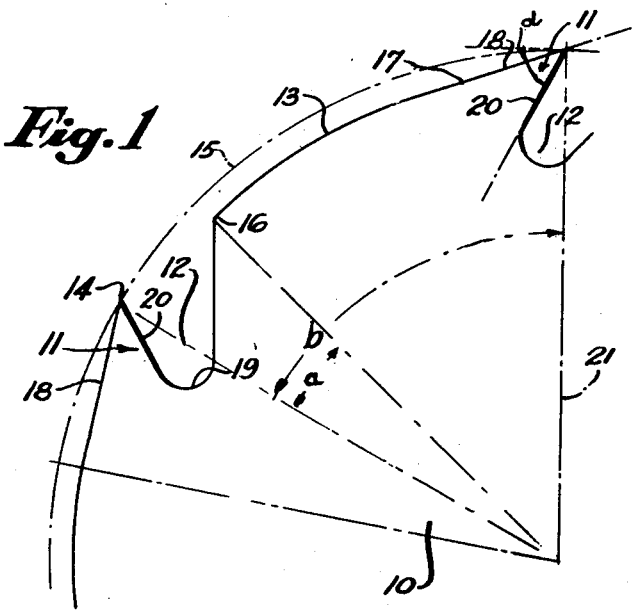
Figure 1 is a side view showing a portion of a circular saw constructed in accordance with the principles of the present invention.
Figure 2:
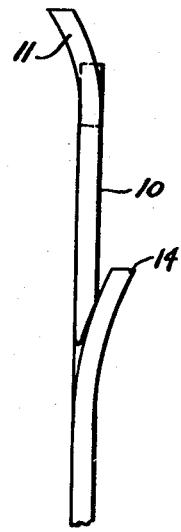
Figure 2 is a front view thereof.
Figure 3:
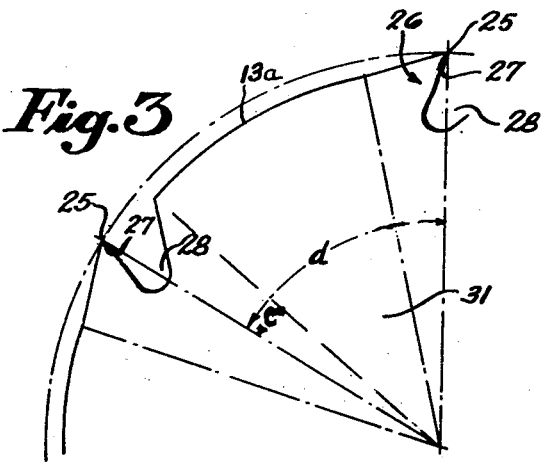
Figure 3 shows a circular saw of a somewhat different type, in partial side elevation.

The rotary saw illustrated in Figures 1 and 2 of the drawings consists of a body 10 provided with teeth 11, gullets 12 and non-cutting edges 13 between the teeth. As shown in the drawings, the distance $b$ between two adjacent teeth is equal at least three times the width $a$ of the gullet of each tooth. In the construction shown in Figure 3 the distance $c$ constituting the width of the gullet of each tooth is equal to one-fourth the distance $d$ between two adjacent teeth. A ratio of one to three in the construction of Figure 1, as well as the ratio of one to four in the construction of Figure 3 are critical in that by the use of this small number of teeth the cutting noise, which is a substantial drawback of saw mills, is effectively eliminated. Furthermore, by the use of the described ratios the cutting of timber can take place effectively while at the same time kickback is effectively prevented.

As shown in Figure 1, the points 14 of the teeth 11 are all located upon an imaginary circle 15, the center of which coincides with the center of the circular saw. On the other hand, the non-cutting portion 13 of the saw is also located upon a circle having the same center as the circle 15. In accordance with the present invention the circle of non-cutting edge 13 bears a definite relationship to the circle 15, namely, the difference between the two circles should not exceed 0.7 mm. if complete safety against kick back is to be achieved. The edge 13 serves as a stop for work, the depth of the cut of which cannot be more than said difference.

In the construction of Figure 1 the gullet 12 terminates at 16, while the tooth 11 begins at the point 17. Thus, the distance between the points 16 and 17 constitutes the smooth edge 13 which does not participate in the cutting operation and which has the above-described, uniform diameter.

The back 18 of the tooth extends from the point 17 to the cutting point 14, and rises gradually from the smaller diameter of the edge 13 to the larger diameter of the circle 15.

An important feature of the present invention is the small angle $\delta$ between a line perpendicular to the line 21 extending to the center of the saw and the line 20 constituting the face of the tooth. In accordance with the present invention this angle can be made smaller than in prior art due to the rigidity of the periphery, thereby improving the chipping action. Consequently, less power is required for sawing and there is less wear on the cutting edge.

It is apparent that in the described construction it is only the point 14 and the adjoining face 20 of the tooth which participate in the cutting operation, the actual cutting surface being quite small, namely, about 0.7 mm.

As shown in Figure 2, the tooth 11 may be set in relation to the body 10 of the saw, the inclination amounting to about one-half of a millimeter, or more.

In the construction shown in Figure 3 the point 25 of a tooth 26 is somewhat swaged at 27, thereby facilitating the side clearance. In other respects the gullet 28 of the tooth 26 is essentially similar to the gullet 12.

Figure 4:
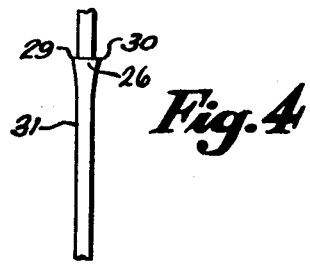
Figure 4 is an end view of the saw shown in Figure 3.

As shown in Figure 4, the tooth 26 is not set, but is treated by a cold forming operation so as to form edges 29 and 30, each of which is spaced to the extent of about one-half of a millimeter or more, from the adjacent surface of the saw 31. Furthermore the projection of the tooth 26 beyond the periphery 13a may be caused by an upward swaging of the material.

Obviously the swaged edges of the teeth 26 of Figure 4 may be replaced by the set teeth 11 of Figure 2, and vice versa.

Figure 5:
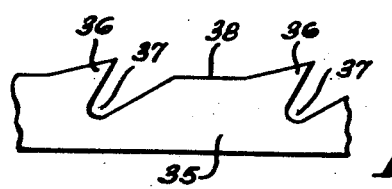
Figure 5 is a fragmentary side elevation showing a band saw.

Figure 5 illustrates a portion of a band saw 35, having teeth 36, gullets 37 and intermediate, non-cutting edges 38.

The teeth and the gullets of the band saw 35 are formed in accordance with the same principles as those of the rotary saw disclosed in Figure 1. The edge 38 serves here as a stop for the cutting operation of the teeth.

In actual practice a circular saw having a diameter of 350 mm. may be provided with eight teeth and may be conveniently operated at 3,500 revolutions per minute.

It is apparent that it is much easier to preserve and treat a saw of this type since the eight teeth of the saw can be more easily sharpened and adjusted than the 60 to 90 teeth of prior art saws. Timber can be supplied to the saw by hand and can be cut effectively up to the maximum thickness permitted by the diameter of the blade. In the event of an automatic feed the speed of feed can be conveniently increased to 90 meters per minute. In this case to compensate for the increased performance, either the number of teeth or the speed of the saw blade has to be increased correspondingly. The cutting is considerably facilitated by the use of the small cutting angle δ, and the small number and size of the teeth effectively eliminate noise during operation. Due to the small protrusion of the teeth above the non-cutting circumference of the saw kick back is effectively eliminated, since loose pieces of timber will be engaged by this saw only at a small restricted area, and there is no danger that a loose piece of timber can be hit by a full face of the saw tooth. Furthermore the kick back created by a stalling saw blade is also eliminated since the cutting area of each tooth is effectively set by the circular periphery; at no time will a tooth be required to cut more than it actually can.

Furthermore, the danger of injury to the operator is greatly reduced due to the limited cutting area of the saw.

It is apparent that the invention given above has been given solely by way of illustration and not by way of limitation, and that it is subject to wide variations and modifications within the scope of the described invention. All such variations and modifications are to be included within the scope of the present invention.

What is claimed is:

1. As a new article of manufacture, a saw blade of the kind described including a body portion and individual teeth spaced apart along the peripheral edge of the body portion and extending beyond the peripheral edge of the body portion, each tooth being substantially wedge-shaped and having a flat, straight, front face inclined forwardly in relation to the cutting movement of the blade and a back surface inclined at an acute angle to the front face and extending to the peripheral edge of the body portion, the body portion having a gullet extending inwardly from the peripheral edge thereof in advance of each tooth with the front face of the adjacent tooth constituting a continuation of the rear edge of the gullet, said peripheral edge on the body portion between the juncture of the back of a tooth and the forward edge of the next succeeding gullet being of circular configuration.

2. As a new article of manufacture, a saw blade of the kind described including a body portion and individual teeth spaced apart along the peripheral edge of the body portion and extending beyond the peripheral edge of the body portion, each tooth being substantially wedge-shaped and having a flat, straight, front face inclined forwardly in relation to a cutting movement of the blade and a back surface inclined at an acute angle to the front face and extending to the peripheral edge of the body portion, the body portion having a gullet extending inwardly from the peripheral edge thereof in advance of each tooth with the front face of the adjacent tooth constituting a continuation of the rear edge of the gullet, and a uniform edge on the body portion running parallel to the cutting movement of the teeth between the juncture of the back of each tooth and the forward edge of the next succeeding gullet, the said uniform edge acting as a stop to limit the depth of cut.

3. As a new article of manufacture, a saw blade of the kind described including a body portion and individual teeth spaced apart along the peripheral edge of the body portion and extending beyond the peripheral edge of the body portion a distance of approximately seven-tenths of a millimeter, each tooth being substantially wedge-shaped and having a flat, straight, front face inclined forwardly in relation to the cutting movement of the blade and a back surface inclined at an acute angle to the front face and extending to the peripheral edge of the body portion, the body portion having a gullet extending inwardly from the peripheral edge thereof in advance of each tooth with the front face of the adjacent tooth constituting a continuation of the rear edge of the gullet, and a uniform edge on the body portion running parallel to the cutting movement of the teeth between the juncture of the back of each tooth and the forward edge of the next succeeding gullet, the said uniform edge acting as a stop to limit the depth of cut.

4. As a new article of manufacture, a saw blade of the kind described including a body portion and individual teeth spaced apart along the peripheral edge of the body portion and extending beyond the peripheral edge of the body portion, each tooth being substantially wedge-shaped having a flat, straight, front face inclined forwardly in relation to the cutting movement of the blade and a back surface inclined at an acute angle to the front face and extending to the peripheral edge of the body portion, the body portion having a gullet extending inwardly from the peripheral edge thereof in advance of each tooth with the front face of the adjacent tooth constituting a continuation of the rear edge of the gullet, and a uniform edge on the body portion running parallel to the cutting movement of the blade between the juncture of the back of each tooth and the forward edge of the next succeeding gullet, the said uniform edge acting as a stop to limit the depth of cut, and the distance between the edges of the face of successive teeth being related to the width of a gullet in a ratio of between three and four to one.

5. As a new article of manufacture, a saw blade of the kind described including a body portion and individual teeth spaced apart along the peripheral edge of the body portion and extending beyond the peripheral edge of the body portion a distance of approximately seven-tenths of a millimeter, each tooth being substantially wedge-shaped having a flat, straight, front face inclined forwardly in relation to the cutting movement of the blade and a back surface inclined at an acute angle to the front face and extending to the peripheral edge of the body portion, the body portion having a gullet extending inwardly from the peripheral edge thereof in advance of each tooth with the front face of the adjacent tooth constituting a continuation of the rear edge of the gullet, and a uniform edge on the body portion running parallel to the cutting movement of the teeth between the juncture of the back of a tooth and the forward edge of the next succeeding gullet, the said uniform edge acting as a stop to limit the depth of cut, and the distance between the edges of the faces of successive teeth being related to the width of a gullet in a ratio of between three and four to one.

6. As a new article of manufacture, a saw blade of the kind described including a body portion having a straight edge and individual teeth spaced apart along the straight edge of the body portion and extending beyond the straight edge of the body portion, each tooth being substantially wedge-shaped and having a flat, straight, front face inclined forwardly in relation to the cutting movement of the blade and a back surface inclined at an angle to the front face and extending to the straight edge of the body portion, the body portion having a gullet extending inwardly from the straight edge thereof in advance of each tooth with the front face of the adjacent tooth constituting a continuation of the rear edge of the gullet.

WILHELM GRUPP.

REFERENCES CITED

The following references are of record in the file of this patent:

UNITED STATES PATENTS

| Number | Name | Date |
| --- | --- | --- |
| 7,603 | Knowles | Aug. 27, 1850 |
| 149,748 | Hale | Apr. 14, 1874 |
| 1,811,079 | Forsyth | June 23, 1931 |

FOREIGN PATENTS

| Number | Country | Date |
| --- | --- | --- |
| 523,586 | France | Aug. 25, 1921 |
| 416,825 | Great Britain | Sept. 21, 1934 |
| 537,764 | Great Britain | July 4, 1941 |